(12) United States Patent
Zhong

(10) Patent No.: US 7,381,918 B2
(45) Date of Patent: Jun. 3, 2008

(54) RETURN ENSURING ASSEMBLY FOR EJECTOR RETAINER PLATE

(75) Inventor: Jian-Hua Zhong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,853

(22) Filed: Oct. 13, 2006

(65) Prior Publication Data

US 2007/0241479 A1    Oct. 18, 2007

(30) Foreign Application Priority Data

Apr. 14, 2006    (CN) .................. 2006 1 0060294

(51) Int. Cl.
*H01H 9/02* (2006.01)
(52) U.S. Cl. .................... 200/293; 200/332.1
(58) Field of Classification Search ............ 200/332.1
See application file for complete search history.

(56) References Cited

U.S. PATENT DOCUMENTS 2,768,256 A * 10/1956 Barecki et al. .......... 200/332.1
3,718,789 A *  2/1973 Hook ......................... 200/332
5,213,205 A *  5/1993 Laubach et al. ............ 200/293

* cited by examiner

*Primary Examiner*—Renee S Luebke
(74) *Attorney, Agent, or Firm*—Jeffrey T. Knapp

(57) ABSTRACT

An exemplary return ensuring assembly (20) includes a switch (21), a connector (22), a housing (23) for receiving the switch and the connector, and an adjusting screw (26). The switch has includes a body (211), an actuator (212) formed on the body, and a number of contacts (213) electrically coupled to the body. The connector is electrically coupled to the contacts of the switch. The connector has a number of connector ends (2221). The housing includes a bottom plate (231), a first sidewall (232) extending from an edge of the bottom plate, and a second sidewall (233) extending from an opposite edge of the bottom plate. The second sidewall defines an adjusting screw hole (2322) therein. The adjusting screw engages in the adjusting screw hole and abuts the switch.

12 Claims, 5 Drawing Sheets

RETURN ENSURING ASSEMBLY FOR EJECTOR RETAINER PLATE

DESCRIPTION

1. Field of the Invention

The present invention generally relates to return ensuring assemblies for ejector retainer plates in mold devices.

2. Discussion of the Related Art

With ongoing development in manufacturing technologies, injection molding is now in widespread use in many industries. During the injection molding process, plastic materials are heated to a molten state in a heating cylinder and then injected under a high pressure to fill a cavity of a mold. The plastic materials in the molten state are cooled inside the mold so as to be hardened and form a molded product. The molded product is then removed from the cavity of the mold by an ejector device when the mold is opened, and can be taken to storage or to subsequent processing stations.

The ejector device includes an ejector retainer plate. The ejector retainer plate is driven by an external device to eject the molded product from the mold. However, during the injection molding process, it is common for the mold to be closed before the ejector retainer plate has retracted to its original position, thereby damaging the mold. Therefore, a return ensuring assembly is provided in the mold to detect the position of the ejector retainer plate.

Referring to FIG. 1, a typical return ensuring assembly 10 is shown. The return ensuring assembly 10 is substantially a switch having a body 11. The body 11 is substantially cuboid, and has two opposite side surfaces 111 and two opposite end surfaces 112 connected with the two side surfaces 111 correspondingly. An actuator 12 is provided at one of the side surfaces 111. A first contact 13 is formed at the other side surface 111, and a pair of spaced-apart second contacts 14 are formed at one of the end surfaces 112. The first and second contacts 13 and 14 are electrically coupled to an inner circuit (not shown) of the body 11.

In use, the first and second contacts 13 and 14 are respectively electrically coupled to first and second external circuits (not shown) by welding. When an ejector retainer plate (not shown) is separated from the actuator 12, the first external circuit is in a conductive state, and the second external circuit is in a disconnected state. When the ejector retainer plate returns to its original position, it applies pressure on the actuator 12. Accordingly, the first external circuit changes to a disconnected state, and the second external circuit changes to a conductive state. Thus, an operator knows whether the ejector retainer plate has returned to its original position according to the states of the first and second external circuits.

In the above return ensuring assembly 10, the first and second contacts 13 and 14 are electrically coupled to the external circuits by welding. It requires detachment or re-weld the connection between the first and second contacts 13 and 14 and the external circuits. Installation or removal of the return ensuring assembly 10 is unduly time-consuming and laborious. These problems are multiplied in mass production facilities, and result in increased costs.

Therefore, a new return ensuring assembly is desired in order to overcome the above-described shortcomings.

SUMMARY

A return ensuring assembly includes a switch and a connector. The switch has a body, an actuator formed on the body, and a number of contacts electrically coupled to the body. The connector is electrically coupled to the contacts of the switch. The connector has a number of connector ends.

Other novel features will become more apparent from the following detailed description, when taken in conjunction with the accompanying drawings.

BRIEF DESCRIPTION OF THE DRAWINGS

Many aspects of the return ensuring assembly can be better understood with reference to the following drawings. The components in the drawings are not necessarily drawn to scale, the emphasis instead being placed upon clearly illustrating the principles of the present return ensuring assembly. Moreover, in the drawings, like reference numerals designate corresponding parts throughout the several views.

DETAILED DESCRIPTION OF THE EMBODIMENTS

Figure 1:
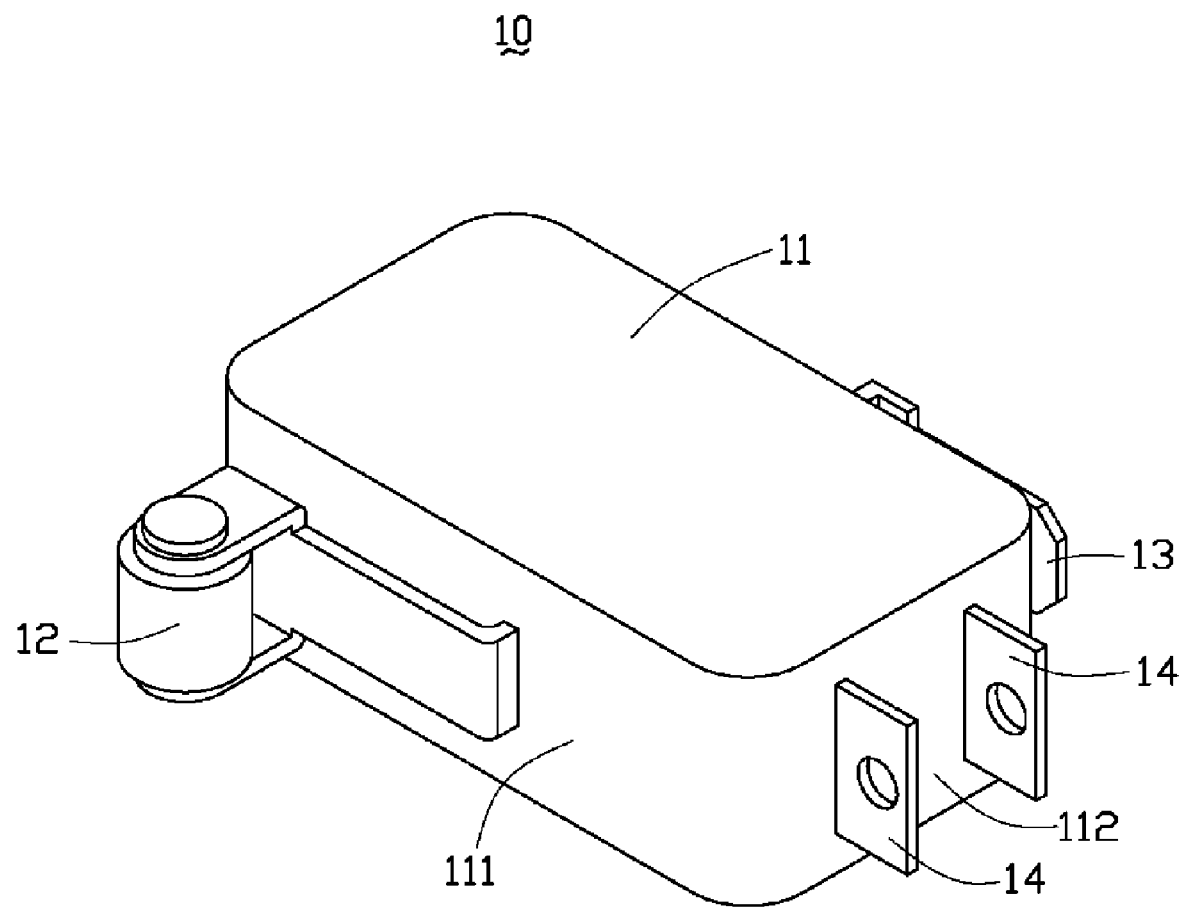
FIG. 1 is an isometric view of a conventional return ensuring assembly.
Figure 2:
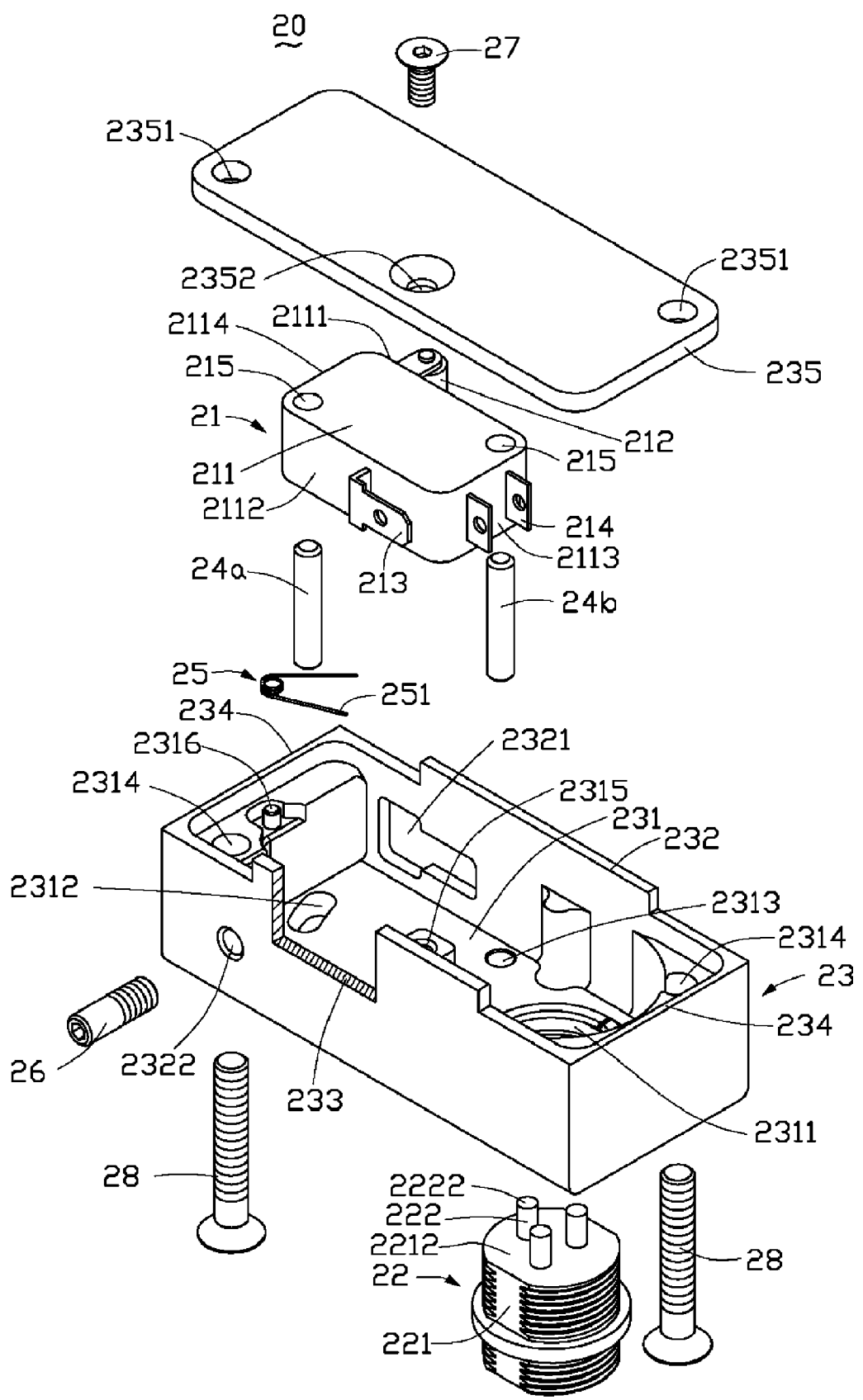
FIG. 2 is an exploded, isometric view of a return ensuring assembly having a connector in accordance with a preferred embodiment.

Referring now to the drawings in detail, FIG. 2 shows a return ensuring assembly 20 for an ejector retainer plate (not shown) incorporated in a mold device (not shown). The ejector retainer plate and the mold device are taken here as an exemplary application for the purposes of describing details of the return ensuring assembly 20 of the preferred embodiment. The return ensuring assembly 20 includes a switch 21, a connector 22, a switch housing 23, a guiding shaft 24a, a pivot shaft 24b, a torsion spring 25, an adjusting screw 26, a clamping screw 27, and a pair of fastening screws 28.

The switch 21 includes a main body 211. The main body 211 is substantially an oblong cube, and has four side surfaces 2111, 2112, 2113, and 2114. An actuator 212 protrudes from the first side surface 2111, and may be a toggle, a rocker, a push-button or any type of mechanical device. A first contact 213 protrudes from the second side surface 2112, and a pair of spaced-apart second contacts 214 protrude from the third surface 2113. The actuator 212, the first contact 213, and the second contacts 214 are electrically coupled to an inner circuit (not shown) of the main body 211. The main body 211 defines two shaft channels 215 sleeved on the guiding shaft 24a and the pivot shaft 24b correspondingly.

Figure 3:
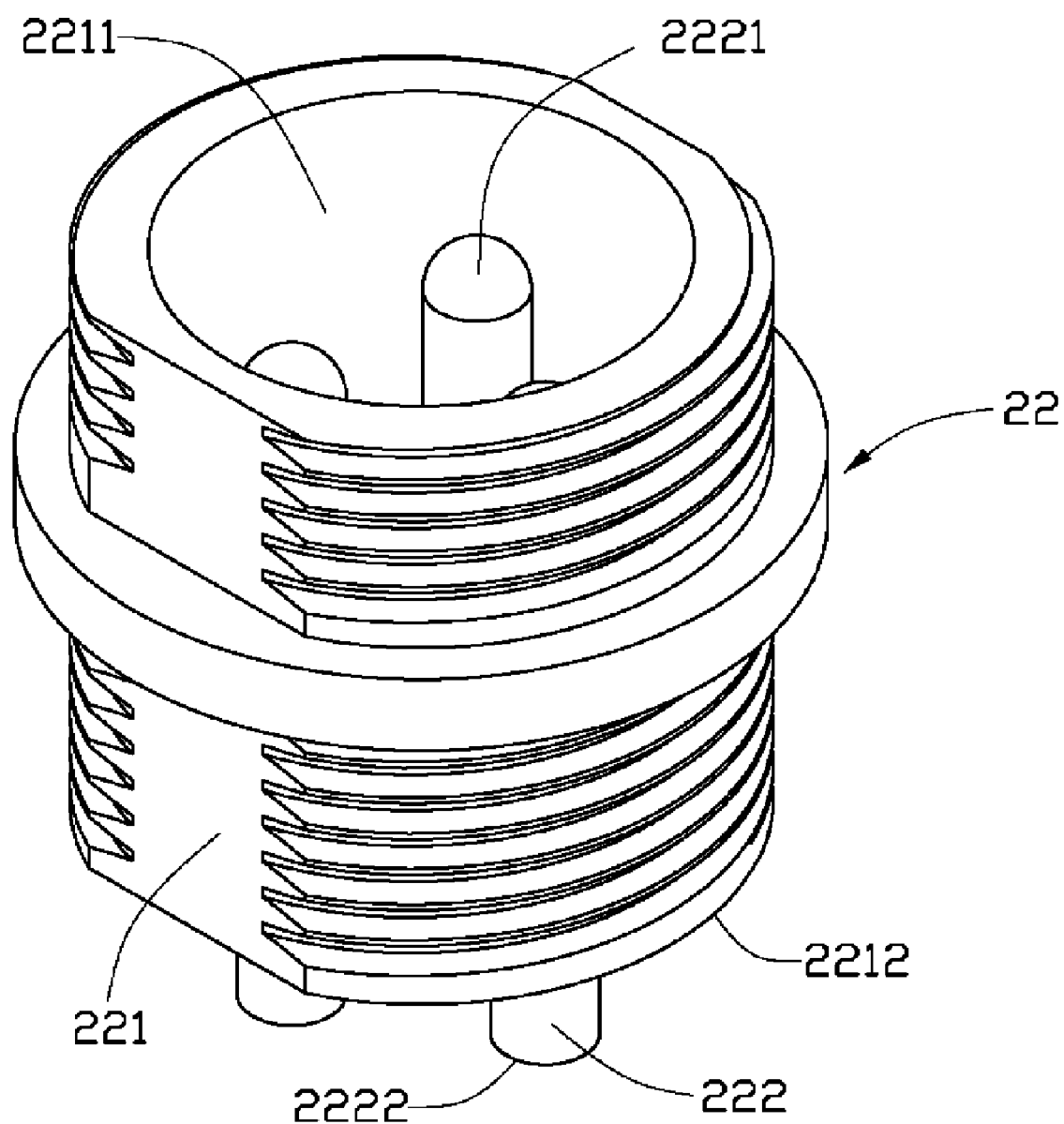
FIG. 3 is an enlarged, isometric view of the connector of FIG. 2.

Referring also to FIG. 3, the connector 22 includes a body 221 and three prongs 222 formed on the body 221. The body 221 is substantially a hollow cylinder, and includes an opening 2211 and a base 2212 at an end of the body 221. An outer surface of the body 221 has a plurality of screw threads. The prongs 222 are made of conductive material. Each of the prongs 222 extends through the base 2212 of the body 221. Each of the prongs 222 further has a connector end 2221 situated in the opening 2211 and a contact end 2222 situated at the base 2212. The connector ends 2221 are configured to be electrically coupled to external circuits (not shown) conveniently by attaching the connector 22 to a socket (not shown). The contact ends 2222 are configured for electrically coupling to the first and second contacts 213 and 214 of the switch 21 by, for example, wirings (not shown).

The switch housing 23 is substantially a hollow oblong cube, and configured for receiving the switch 21 and the connector 22. The switch housing 23 includes a bottom plate 231, a first sidewall 232 extending from an edge of the bottom plate 231, a second sidewall 233 extending from an opposite edge of the bottom plate 231, a pair of end walls 234 connecting the first sidewall 232 and the second sidewall 233, and a cover 235. An actuator opening 2321 is defined on the first sidewall 232, and the actuator 212 of the switch 21 is allowable to protrude through the actuator opening 2321. An adjusting screw hole 2322 is defined on the second sidewall 233, and is inserted with the adjusting screw 26. The bottom plate 231 defines a connector screw hole 2311 having a screw threading to receive the connector 22. The bottom plate 231 defines a sliding groove 2312 and a pivot hole 2313. The bottom plate 231 defines a pair of screw guiding barrels 2314 extending therefrom. The bottom plate 231 further defines a clamping screw barrel 2315 extending therefrom, adjacent to the second sidewall 233. A column 2316 is disposed on the bottom plate 231 adjacent to the sliding groove 2312. The column 2316 is substantially a cylinder, but may be in other shapes. The cover 235 defines a pair of fastening through holes 2351 corresponding to the screw guiding barrels 2314 of the bottom plate 231. The cover 235 further defines a clamping screw hole 2352 aligned with the clamping screw barrel 2315 of the bottom plate 231.

The guiding shaft 24a and the pivot shaft 24b are each substantially a cylinder. The guiding shaft 24a can be engaged in one of the shaft channels 215 of the switch 21 and the sliding groove 2312 of the switch housing 23, and the pivot shaft 24 can engage in the other shaft channel 215 of the switch 21 and the pivot hole 2313 of the switch housing 23, thus, the switch 21 can rotate along the sliding groove 2312 around an axis of the pivot shaft 24b and the pivot hole 2313 in the switch housing 23.

The torsion spring 25 is helical and preferably metallic, and has two extending arms 251 at two opposite ends thereof. The torsion spring 25 is sleeved around the column 2316 of the switch housing 23. In alternative embodiment, the torsion spring 25 can be replaced by another elastic member, for example, a compression spring or an elastic plate.

The adjusting screw 26 can be engaged in the adjusting screw hole 2322 of the switch housing 23. The adjusting screw 26 and the torsion spring 25 cooperatively fasten the switch 21 in the switch housing 23.

The clamping screw 27 can be engaged in the clamping screw hole 2352 and the clamping screw barrel 2315 of the switch housing 23 to integrate the switch housing 23 into a single unified body.

The fastening screws 28 each can be engaged with the screw guiding barrel 2314 and the fastening through hole 2351 of the switch housing 23 to fasten the switch housing 23 to the mold device.

Figure 4:
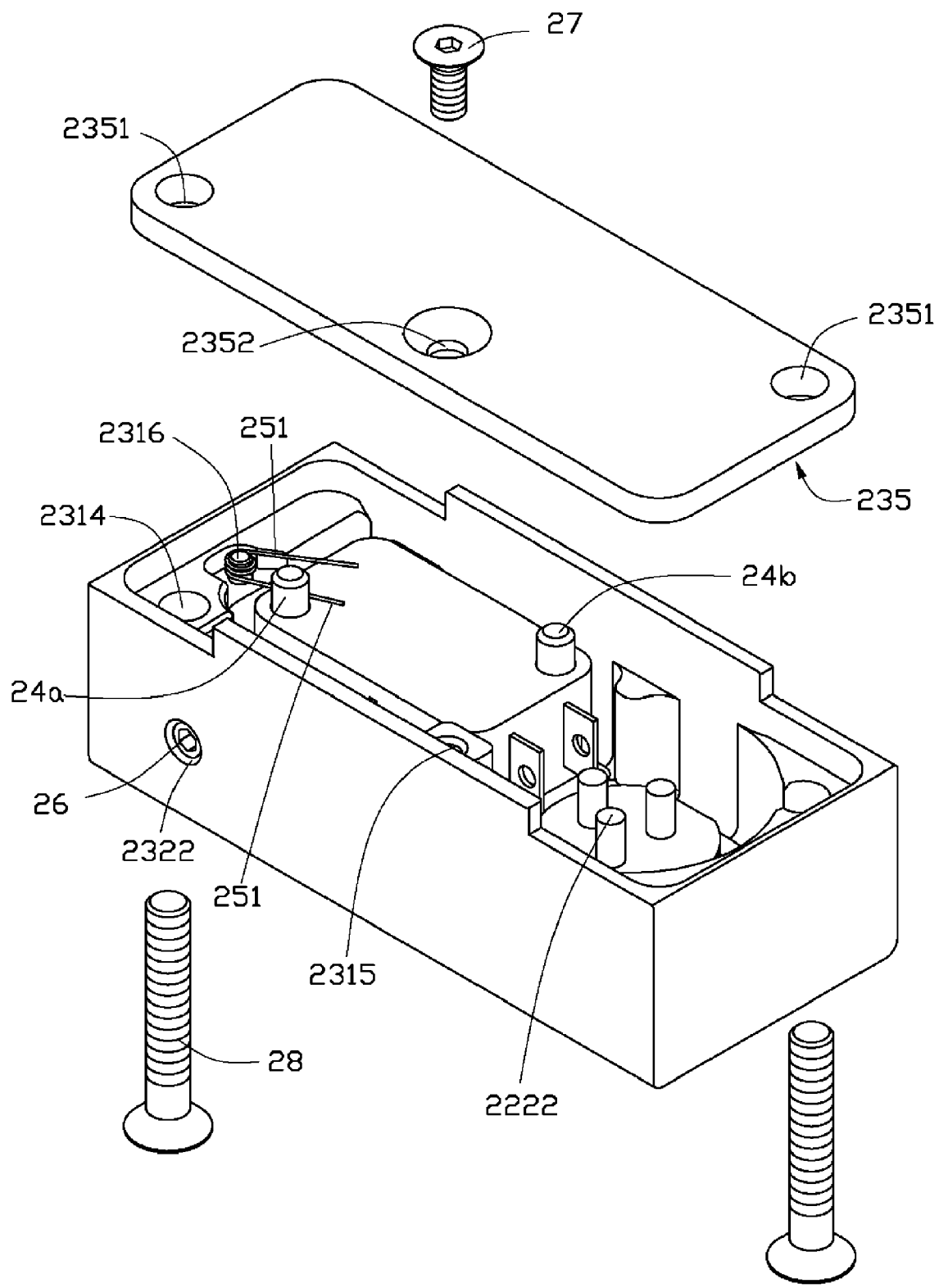
FIG. 4 is an enlarged, part assembled, isometric view of the return ensuring assembly of FIG. 2.
Figure 5:
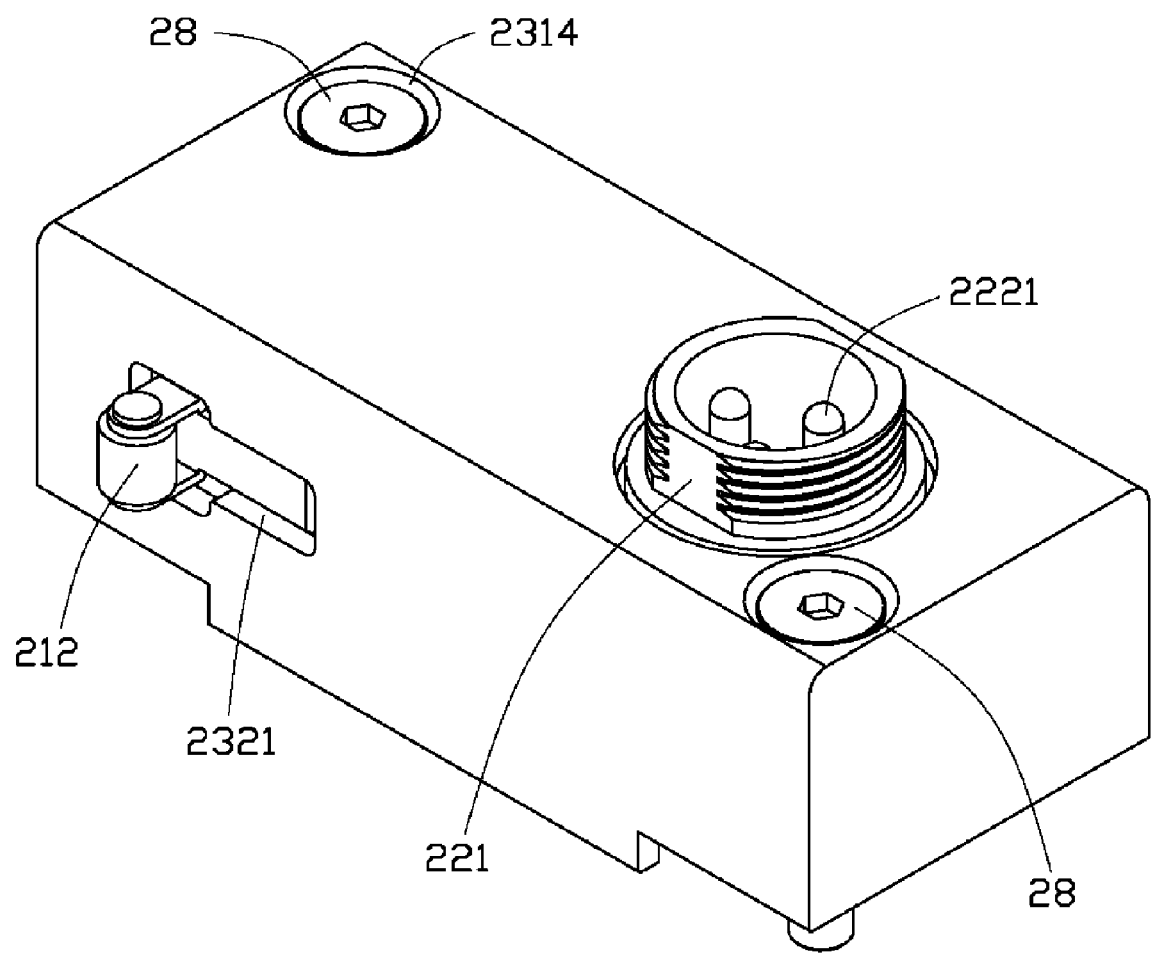
FIG. 5 is an enlarged, assembled, isometric view of the return ensuring assembly of FIG. 2.

Referring also to FIG. 4, in assembly, the shaft channels 215 of the switch 21 lie along the sliding groove 2312 and the pivot hole 2313 of the switch housing 23 respectively. The actuator 212 of the switch 21 protrudes through the actuator opening 2321 of the switch housing 23. The guiding shaft 24a passes through one of the shaft channels 215, and is received in the sliding groove 2312. The pivot shaft 24b passes through the other of the shaft channels 215, and is received in the pivot hole 2313. The body 221 of the connector 22 is screwed into the connector screw hole 2311 of the switch housing 23, with the connector ends 2221 of the connector 22 extending from the switch housing 23, and the contact ends 2222 of the connector 22 located in the switch housing 23. The contact ends 2222 are electrically coupled to the first and second contacts 213 and 214 of the switch 21 by wirings (not shown). The torsion spring 25 is sleeved around the column 2316, with one of the arms 251 abutting one of the end walls 234, and the other of the arms 251 abutting the guiding shaft 24a. The adjusting screw 26 screws through the adjusting screw hole 2322, and abuts the switch 21. Thus, the switch 21 is fixed in the bottom plate 231. The clamping screw 27 passes through the clamping screw hole 2352 of the cover 235, and is screwed in the clamping screw barrel 2315, to secure the cover 235 with the bottom plate 231. Thus, the return ensuring assembly 20 is integrated into a whole.

In use, the fastening screws 28 are each passed through the screw guiding barrel 2314 and the fastening through hole 2351, and screwed onto the mold device, with the actuator 212 adjacent to the ejector retainer plate. Thus, the switch housing 23 is fastened to the mold device. The connector ends 2221 of the connector 22 are electrically coupled to a first and second external circuits (not shown) by attaching the connector 22 to a socket (not shown). When the ejector retainer plate is separated from the actuator 212, the first external circuit is in a conductive state, and the second external circuit is in a disconnected state. When the ejector retainer plate returns to its original position, it applies pressure on the actuator 212. Accordingly, the first external circuit changes to a disconnected state, and the second external circuit changes to a conductive state. It is easy for an operator to know whether the ejector retainer plate has returned to its original position according to the states of the first and second external circuits.

The switch 21, is rotated along the sliding groove 2312 of the bottom plate 231 towards or away from the actuator opening 2321 by rotating the adjusting screw 26, thereby adjusting the location of the actuator 212 of the switch 21. This ensures the return ensuring device 20 is in a good working state.

In above-described embodiment, the return ensuring device 20 includes the switch 21 and the connector 22 electrically coupled to the switch 21. The connector 22 includes the connector ends 2221, and the connector ends 2221 are electrically coupled to the external circuits conveniently by attaching the connector 22 to the socket. This saves time in installation and removal of the return ensuring device 20. In addition, the return ensuring device 20 includes the switch housing 23. The switch 21 and the connector 22 are received in the switch housing 23, thereby preventing the switch 21 and the connector 22 from damaging, and postponing the work life of return ensuring device 20.

In alternative embodiments, the switch 21 can be attached to the switch housing 23 by another suitable method, for example, by screwed. The connector 22 can be attached to the switch housing 23 by another suitable method, for example, by pinned. The cover 235 can be attached to the bottom plate 231 by another suitable method, for example, by pinned. The switch housing 23 can be attached to the mold device by another suitable method, for example, by pinned. The switch housing 23 can be omitted, and the switch 21 and the connector 22 are directly attached to the mold device.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A return ensuring assembly, comprising:
   a switch having a body, an actuator formed on the body, and a plurality of contacts electrically coupled to the body;
   a connector electrically coupled to the contacts of the switch, the connector having a plurality of connector ends;
   a housing receiving the switch and the connector, and including a bottom plate, a first sidewall extending from an edge of the bottom plate, and a second sidewall extending from an opposite edge of the bottom plate, the second sidewall defining an adjusting screw hole therein; and
   an adjusting screw engaging in the adjusting screw hole and abutting the switch.

2. The return ensuring assembly as claimed in claim 1, wherein the connector comprises a plurality of prongs each having one of the connector ends and a contact end opposite to the corresponding connector end, the contact ends are electrically coupled to the contacts of the switch, and the prongs are made of conductive material.

3. The return ensuring assembly as claimed in claim 1, wherein the connector comprises a body and a plurality of prongs formed on the body, the body is a hollow cylinder, and comprises an opening and a base at an end of the opening, each of the prongs has one of the connector ends located at the opening and a contact end located at the base, and the contact ends are electrically coupled to the contacts of the switch.

4. The return ensuring assembly as claimed in claim 1, wherein the housing defines an actuator opening therein, and the switch is received in the housing, with the actuator protruding from the actuator opening.

5. The return ensuring assembly as claimed in claim 1, wherein the housing defines a connector screw hole therein, the connector engaging in the connector screw hole so as to be fixed in the housing.

6. The return ensuring assembly as claimed in claim 1, wherein the bottom plate defines a connector screw hole therein, the connector screw hole has a plurality of screw treads, and the connector has a plurality of outer screw threads engaged with the screw threads of the connector screw hole.

7. The return ensuring assembly as claimed in claim 1, wherein an actuator opening is defined in the first sidewall, and the switch is disposed on the bottom plate, with the actuator protruding through the actuator opening.

8. The return ensuring assembly as claimed in claim 1, further comprising a pair of shafts, wherein the body of the switch defines a pair of shaft channels therein, a sliding groove and a pivot hole are defined in the bottom plate, one of the shafts engages in one of the shaft channels and the sliding groove, and the other shaft engages in the other shaft channel and the pivot hole.

9. The return ensuring assembly as claimed in claim 1, further comprising an elastic member, and a column disposed on the bottom plate, wherein the elastic member engages with the column, and the elastic member and the adjusting screw cooperatively fix the switch in the housing.

10. The return ensuring assembly as claimed in claim 9, wherein the elastic member is selected from the group consisting of a torsion spring, a compression spring, and an elastic plate.

11. The return ensuring assembly as claimed in claim 1, wherein the housing further comprises a cover, and the housing is generally a hollow box.

12. The return ensuring assembly as claimed in claim 11, further comprising a clamping screw, wherein the cover defines a clamping screw hole therein, the bottom plate includes a clamping screw barrel, and the clamping screw engages in the clamping screw hole and the clamping screw barrel to integrate the housing into a single unified body.

* * * * *